United States Patent Office 3,394,284
Patented July 23, 1968

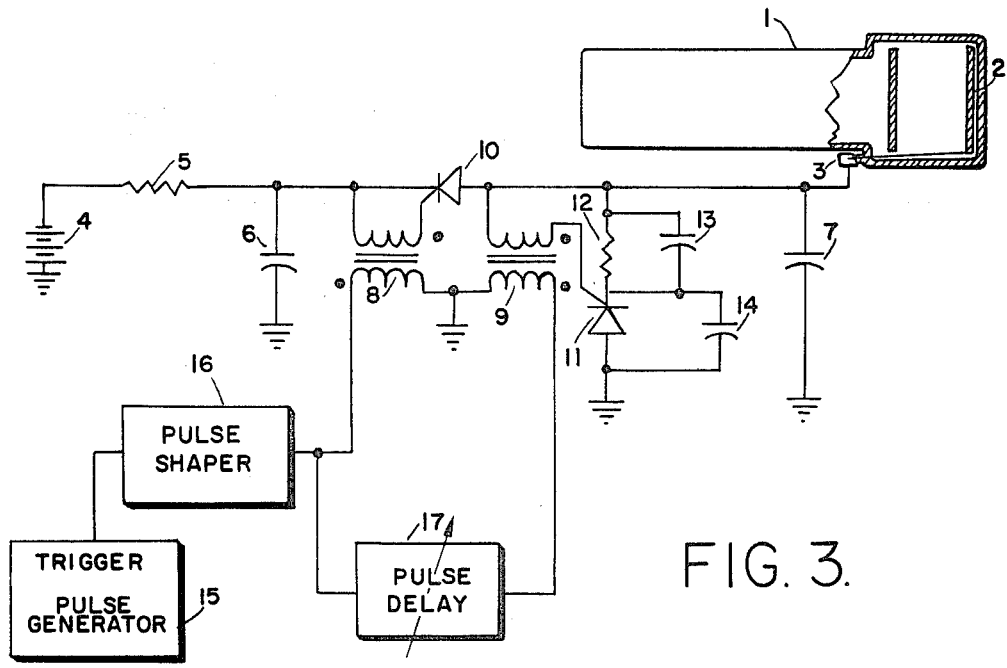
FIG. 3.
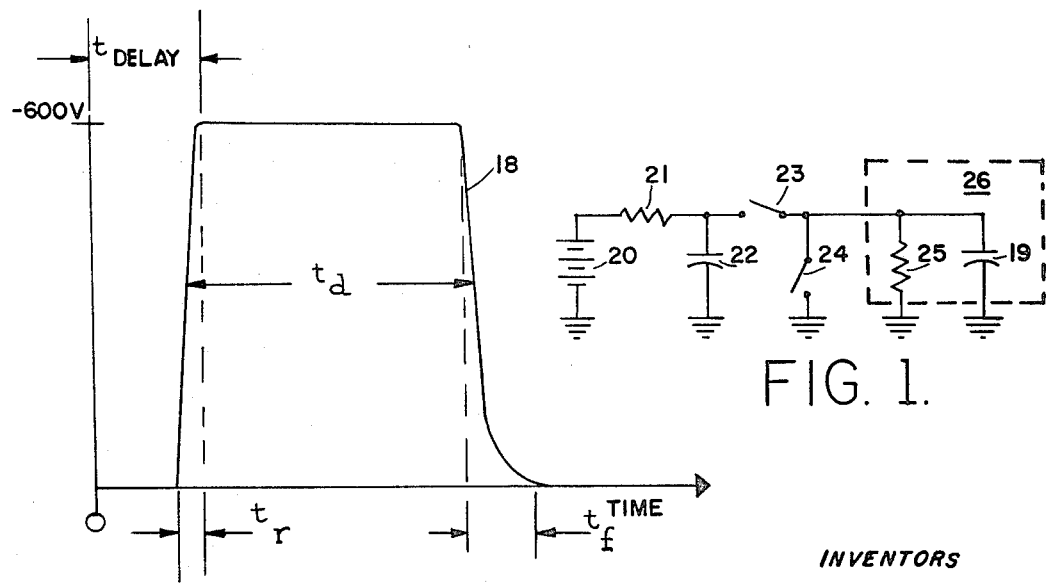
FIG. 1.
FIG. 2.
INVENTORS
ALAN C. HURKAMP
RONALD J. PELLAR
BY Willard R. Matthews jr
ATTORNEY

3,394,284
CAPACITIVE LOADS AND CIRCUITS FOR PROVIDING PULSED OPERATION THEREOF
Alan C. Hurkamp, Brookline, and Ronald J. Pellar, Framingham, Mass., assignors to Sanders Associates, Inc., Nashua, N.H., a corporation of Delaware
Filed Mar. 7, 1966, Ser. No. 532,317
7 Claims. (Cl. 315—12)

ABSTRACT OF THE DISCLOSURE

A capacitor charged to a predetermined value supplies a rectangular wave voltage pulse to a reactive impedance load, in which the rise time, decay time and the magnitude of the applied pulse is determined by the relationship between the charging resistor and source capacitor and that of the load resistance and capacitance.

---

This invention relates to circuits for delivering substantially square wave high voltage pulses to a capacitive load and also to the combination of such circuits with photo tubes and television cameras for the purpose of providing improved stop-motion operation, exposure control and time-gating thereof.

There currently exists a need for circuits which will deliver pulses in the order of hundreds of volts to capacitive loads. It is commonly a requirement that such pulses retain waveform integrity despite inherent shunt capacity characteristics of such loads. An example of such an application is the pulsing of microwave tubes such as klystrons, magnetrons and the like, wherein tube element geometries produce shunt capacitance. It is important in many applications that the pulse rise time be as short as possible, in order to establish a substantially square waveform. This is particularly true in low light intensity photoemissive devices, where it is necessary to avoid degrading resolution and image quality (the image being in sharp focus for only one value of photocathode voltage). Currently available pulse-generating circuits have been found to be inadequate to meet these demands. This is so because the rise time of pulses generated by prior art circuits is limited by the source impedance and the load capacity time constant.

A particularly important application of the circuits herein disclosed is that of pulsing the photocathode electrode of a television camera tube. It has been recognized that the improved pulse-generating circuits of the present invention can be effectively combined with camera tubes to provide stop-motion television display, television exposure control on a frame-by-frame basis, and also time-gating applications. Heretofore, stop-motion display of high-speed events has been accomplished by externally applied stroboscope lighting. This, of course, presents the inconvenience and expense of maintaining and synchronizing double controls and providing adequate light sources and frequency controls for such light sources. Pulsing of the photocathode electrode has not been comprehended by the prior art, and currently available pulse-generating circuits are incapable of effectively accomplishing it.

In accordance with the foregoing needs and deficiencies demonstrated by the current state of the art, it is a principal object of this invention to provide a new and improved circuit for delivering high voltage pulses to a capacitive load.

It is another object of this invention to provide a circuit for delivering high voltage pulses to a capacitive load, which circuit includes a condenser having greater capacitance than the capacitance of such load.

It is another object of this invention to provide a circuit for delivering substantially square wave high voltage pulses having fast rise and fall times for delivery to a capacitive load.

It is another object of this invention to provide a circuit for delivering pulses to a load, whereby such pulses remain substantially free from degradation and distortion due to inherent shunt capacitance in the load.

It is another object of this invention to provide a pulse-forming circuit wherein pulse rise times are limited by the state of the art of high-speed switches and low-inductance circuitry, rather than by the source impedance and load capacity time constant.

It is another object of this invention to provide an improved television camera means for effecting stop-action display by means of pulsing the photocathode electrode of the camera tube with pulse-forming circuits of the type described.

It is another object of this invention to improve linear accelerators with pulse-forming circuits of the type described.

It is another object of this invention to provide an image Orthicon tube having improved exposure control.

It is another object of this invention to provide an image Orthicon tube having improved time-gating means.

These, together with other objects and features of this invention, will be more readily understood from the following detailed description, taken in conjunction with the accompanying drawings, wherein:

FIG. 1 illustrates a schematic diagram of the basic circuit of the pulse-forming means of the invention;

FIG. 2 illustrates a typical output waveform as generated by the circuits of the invention; and FIG. 3 is a partially schematic, partially pictorial representation of the image Orthicon tube with a pulsed photocathode electrode comprehended by the invention.

The novel pulse-producing circuits of this invention find great utility as a means to square-pulse modulate devices having shunt capacitances. Such devices normally have the effect of degrading rise and fall times of pulses generated by standard driving circuits. The advantage of the circuits described herein over conventional driving circuits is that the pulse rise time is limited by the state of the art of high-speed switches and low-inductance circuitry, rather than by the source impedance and the load capacity time constant. Use of such circuits therefore simplifies design in high voltage and high load capacity applications. They also find great utility when low ratios of pulse rise time to pulse duration are important. An example of such an application would be the square-pulse modulation of vacuum tube elements wherein the elements' geometries produce appreciable shunt capacitance.

The basic problem solved by the present invention is that of charging and discharging the voltage across a capacitive load in a short period of time. This implies a voltage source of very low impedance. The invention solves this problem by switching a capacitor charged to an appropriate voltage across the load. The invention also comprehends the use of a capacitor having substantially greater impedance than the inherent shunt capacitance of the load.

Referring now to FIGS. 1 and 2, there is illustrated a circuit embodying the principles of the invention, together with a typical waveform generated thereby. The circuit in FIG. 1 includes a voltage source 20, a current-limiting resistor 21, and a capacitor 22 connected across said voltage source and said current-limiting resistor. The capacitor 22 is selectively connected to a load 26, comprising a load resistor 25 and a load capacitor 19 connected in parallel, by means of a switch 23; and a switch 24 is connected across said load 26. The operation of the circuit is as follows:

When the switch 23 is open, the voltage source 20 charges the capacitor 22 to the potential of said source. When the switch 23 is closed, the capacitor 22 charges the load capacitor 19, the voltage appearing across capacitor 19 effectively being determined by the relationship of the capacitance of capacitor 22 to load capacitor 19.

The circuit of FIG. 1 will produce a square voltage pulse, such as pulse 18, across the load capacitor 19, when $$\frac{C_{22}}{C_{22}+C_{19}} = \frac{R_{25}}{R_{25}+R_{21}}$$

and switch 23 opens just before switch 24 closes. The switch 24 need only be closed long enough to discharge load capacitor 19. The timing for the operation of the switches is determined by the particular pulse length and pulse repetition frequency desired. If resistor 25 is sufficiently great that $\tau_0 \gg \tau_L = R_{25}C_{19}$, where $\tau_0 = R_{21}C_{22}$, switch 23 need only be closed for the duration of the charging of load capacitor 19, which load capacitor is charged by capacitor 22 as described hereinabove. In any event, switch 24 need only be closed during discharge of capacitor 19. The capacitor 22 is charged by means of the voltage source 20 through the current-limiting resistor 21 when switch 23 is in its open position.

The circuit of FIG. 1 is thus able to produce the square wave pulse 18, having fast rise and fall times, due to the fact that the source impedance viewed from the load 26 is very low. This is due to the fact that the capacitance value of capacitor 22 is substantially higher than the capacitance value of load capacitor 19, and the capacitor 22 effectively serves as the voltage source for the load 26. The high value of capacitance of capacitor 22 results in a very low impedance thereof, since $$X_c = \frac{1}{\omega C}$$

and thus the effective source impedance, which is $\approx X_c$, is very low.

The switches referred to above are not restricted to mechanically operated devices, but can be any mechanical, electrical or chemical device which will interrupt or initiate a flow of current. The choice of device will depend upon the application, voltage rating, peak current rating, and other particular parameters involved. Table I below lists a number of electrical devices which can be used for various operation voltages. This table, however, is not all-inclusive, and should not be construed as such.

Table I

| Possible "switches": | Voltage range |
|---|---|
| Transistors, SCR's, gated diodes, etc. | 0–200 |
| SCR's, thyratrons, vacuum tubes, etc. | 0–1000 |
| Vacuum tubes, gas tubes, thyratrons, spark gaps, etc. | 1000–10,000 |
| Spark gaps, krytrons, etc. | 1000–100,000 |

One particularly significant feature of the invention is the use of circuits of the type described to pulse the photocathode of an image Orthicon tube in a television system. Such an application extends greatly the usefulness of the television system. The three main advantages of photocathode pulsing are (1) the ability to stop motion, thereby preventing blur during a single frame, (2) the use of exposure control on a frame-by-frame basis, and (3) improved time-gating.

The use of very short duration pulses on the photocathode electrode of a camera tube can freeze motion. This motion-stopping action is substantially identical to the use of electronic strobe lights and high speed cameras, with the important exception that duration is controlled in the camera, rather than by an external pulsed light source. This passive nature of photocathode pulsing permits the use of existing ambient light to achieve all the effects of electronic strobe lighting. These effects include improved performance of stop-action videotape recording for sporting events, multiple exposure for motion studies, and observation of high-speed phenomena on a single-event or repetitive basis.

Exposure control can be provided with the pulsing circuits of the present invention, since the image Orthicon tube is an integrating device and is similar to photographic film in that the resulting signal is proportional to exposure, as well as scene brightness. Hence, by synchronizing the pulses to the television frame rate and varying the pulse duration manually or automatically from an exposure meter, variations in average scene brightness can be readily accommodated. The dynamic range of the television cameras is thereby increased by a factor of as much as 10,000 to 1, and more.

Time-gating is also achieved by the use of the circuits of the invention. By properly timing the start and duration of the pulse, all events in time can be gated out except those which are occurring when the photocathode is pulsed on.

In all applications of image Orthicon photocathode pulsing, it is important that the pulse rise time or fall time to pulse duration ratio be as small as possible to avoid degrading resolution and image quality. Circuits of the type comprehended by the present invention yield rise times in the order of 50 nanoseconds for a 600-volt peak pulse with a duration of 25 microseconds. These values are, of course, given by way of illustration only, and it is pointed out that peak pulse durations of a few microseconds or less are within the present state of the art.

Referring now to FIG. 3, there is illustrated thereby a circuit suitable to pulse the photocathode of an image Orthicon tube. It is necessary in such an application to obtain short exposure times without degrading the picture quality. This requires short, square pulses of about 600 volts. The circuit of FIG. 3 uses solid state silicon-controlled rectifiers (SCR's 10 and 11) as electronic switches. Silicon-controlled rectifiers are particularly suitable to the circuits of the present invention, due to their fast switching times and high breakover voltage. Such breakover voltages are in the order of 800 volts. Pulse transformers 8 and 9 are used to provide isolation between the low-voltage pulse circuitry which comprises trigger pulse generator 15, pulse shaper 16 and pulse delay means 17, and the high-voltage silicon-controlled rectifier circuit. Series resistor 12 and by-pass capacitor 13 in the shunt leg of the circuit act as a ringing suppressor. The high current-carrying capacity (low impedance) of the silicon-controlled rectifiers yields a rise time of the output that is much faster than the switching time of the silicon-controlled rectifiers. This is illustrated in FIG. 2, wherein the rise time $t_r$ is approximately 50 nanoseconds, and the switching time $t_d$ is approximately 200 nanoseconds. The pulse fall time is degraded to about one microsecond by the ringing suppressor circuitry. This is illustrated by $t_f$ of FIG. 2. Presently known circuit configurations can achieve pulse durations in the order of ten microseconds and are limited by the pulse circuitry and not by the silicon-controlled rectifiers. Such circuits are capable of yielding a minimum output pulse duration equal to the silicon-controlled rectifier recovery time of four microseconds. If better silicon-controlled rectifiers or other similar types of switching devices are manufactured which have recovery times of less than four microseconds, then such circuits are capable of yielding minimum output pulses whose durations are equal thereto. The peak voltage of the output pulse will vary less than five percent and result in no measurable degradation in picture quality.

In the operation of the circuit, the voltage source 4 charges the capacitor 6 to the potential of said source through current-limiting resistor 5. When silicon-controlled rectifier 10 is caused to conduct by the application of a control pulse thereto through transformer 8, the capacitor 7 is charged to approximately 600 volts by the current flowing thereto from the capacitor 6; the control pulse is also passed through the pulse delay means 17 and appears at transformer 9 some interval later. The control pulse appearing at transformer 9 turns on silicon-controlled rectifier 11, this occurring after the control pulse appearing at transformer 8 has ceased and the silicon-controlled rectifier 10 has been turned to its "off" state. When the silicon-controlled rectifier 11 is in its "on" state, it causes capacitor 7 to discharge to ground through the shunt leg comprising resistor 12 and silicon-controlled rectifier 11. Capacitor 7 is therefore charged and discharged in the manner above described. The resulting voltage pulse appearing on capacitor 7 is applied to the photocathode electrode 2 of image Orthicon 1 through connector 3. The following Table II indicates typical values for the circuit components of FIG. 3. These values, of course, are illustrative only, and not to be taken in a limiting sense.

Table II

| Component: | | Value |
|---|---|---|
| Resistor 5 | ohms | 130,000 |
| Resistor 12 | do | 12 |
| Capacitor 6 | microfarads | .05 |
| Capacitor 14 | do | .004 |
| Capacitor 7 | picofarads | 1500 |
| Capacitor 13 | microfarads | .01 |
| Direct Current Supply 4 | volts | −600 |

Another application of the novel circuits of the present invention comprehends the combination of such circuits with a linear accelerator. A linear accelerator is a device which accelerates electrons or ions to very high energies and is commonly used in nuclear research. Such a device is composed of a series of drift tubes alternately connected and having accelerating gaps therebetween. The drift tubes are driven with a radio frequency high voltage source so that adjacent drift tubes are of alternate polarity. If a bundle of electrons or ions is introduced at the proper time, the bundle will be accelerated, thereby increasing their velocity as they cross each gap. In order to maintain synchronism with R.F. source as they pick up speed, the drift tubes are made longer, such that the time for an electron or ion to traverse the drift tube is constant and equal to the period of the R.F. source. By driving the drift tubes with the novel circuits herein described, and by decreasing the pulse width as the electron or ion speeds up, the length of the drift tubes is no longer constrained and can yield higher total energies per unit length. The square pulse can also yield more mono-energetic electrons or ions at the expense of phase stability. If phase stability is important, the rise time can be degraded the necessary amount.

Other applications of the circuits of the invention include the use of such circuits for photomultiplier gating, pulsing microwave tubes, modulating or pulsing electrons or ion beams, providing fault protection of vacuum- or gas-filled tubes by pulsing the grids thereof to cutoff, providing fast multiplexing and discharge of peak-holding circuits, and providing digital-to-analog conversion. It should not be construed that the present invention is limited to these applications, however, as the basic circuits are applicable in any situation where the voltage across a capacitive load is to be charged rapidly.

It is to be understood that the above-described arrangements are illustrative of the applications of the principles of this invention. Numerous other arrangements may be devised by those skilled in the art without departing from the scope of the invention. Having thus described the invention, what is claimed as new and desired to be secured by Letters Patent is:

1. A circuit for delivering substantially square wave high voltage pulses to a capacitive load comprising charging resistive means and capacitor means having a capacitance that is greater than the capacitance of said capacitive load and connected in parallel relationship therewith, in which the values of said charging resistive means and said capacitor means are determined by the equation $$\frac{C_S}{C_S+C_L}=\frac{R_L}{R_S+R_L}$$

in which $C_L$ is the capacitance of said load, $C_S$ is the capacitance of said capacitor means, $R_L$ is the resistance of the load and $R_S$ is the resistance of said resistive means, means for periodically charging said capacitor means through said charging resistor from a source connected thereto, and means for discharging said capacitive load by means connected in parallel with said load.

2. A pulse-forming circuit for pulsed operation of a capacitive load comprising a direct current source, a charging resistor, a capacitor in series with said source and said resistor having a capacitance greater than the capacitance of said capacitive load, means for intermittently connecting said capacitor in parallel with said capacitive load, means for intermittently charging said capacitor from said direct current source through said charging resistor, and means for discharging said capacitive load through means connected in parallel with said load for a period of time subsequent to each charging operation, the value of said charging resistor and said capacitor being determined by the equation $$\frac{C_S}{C_S+C_L}=\frac{R_L}{R_S+R_L}$$

where $C_L$ is the capacitance of said capacitive load, $C_S$ the capacitance of said capacitor, $R_L$ is the resistance of said load, and $R_S$ the resistance of said charging resistor.

3. A pulse-forming circuit as defined in claim 2, wherein said means for charging said capacitor comprises first switch means for connecting said capacitor to said capacitive load, said capacitor being charged by said direct current source when said first switch means is in the open position, and actuating means for periodically opening and closing said first switch means.

4. A pulse-forming circuit as defined in claim 3, wherein said means for discharging said capacitive load comprises second switch means effective to short circuit said capacitive load to ground and control means operatively connected thereto, said control means being responsive to said actuating means and effective to open and close said second switch.

5. A pulse-forming circuit as defined in claim 4, wherein said first and second switch means comprise silicon-controlled rectifiers.

6. A circuit for applying a voltage to the photocathode circuit of a television camera tube, said photocathode circuit exhibiting an inherent resistance and an inherent capacitance to ground, comprising
a direct current source,
a charging resistor,
a storage capacitor,
means for connecting said source, said resistor and said capacitor in series whereby said capacitor is charged continuously from said source through said resistor, the value of said charging resistor and said capacitor being determined by the equation $$\frac{C_S}{C_S+C_L}=\frac{R_L}{R_S+R_L}$$

where $C_L$ is said inherent capacitance of said photocathode circuit, $C_S$ is the capacitance of said storage capacitor, $R_L$ is said inherent resistance of said photocathode circuit, and $R_S$ is the resistance of said charging resistor,
a first switching means for selectively connecting said capacitor in parallel with said photocathode circuit,
a second switching means for selectively connecting the photocathode circuit to ground to discharge the capacitance associated therewith,
a pulse generator, a pulse shaper connected to the output of said generator, means for closing said first switching means in response to the output of said pulse shaper, a pulse delay circuit connected to the output of said pulse shaper, and a means for closing said second switching means in response to an output signal from said pulse delay circuit.

7. A circuit for applying a voltage to the photocathode circuit as defined in claim 6, wherein said first and second switch means comprise silicon-controlled rectifiers.

References Cited
UNITED STATES PATENTS

| | | | |
|---|---|---|---|
| 3,051,865 | 8/1962 | Marchese | 315—30 X |
| 3,144,579 | 8/1964 | Holsinger et al. | 315—13 |
| 3,182,125 | 5/1965 | Kampmeyer et al. | 178—7.2 X |
| 3,193,722 | 7/1965 | Opitz | 315—30 |
| 3,214,696 | 10/1965 | Hickey | 328—67 |
| 3,257,619 | 6/1966 | Fackler et al. | 328—67 X |
| 3,331,968 | 7/1967 | Hickey | 328—67 X |

RODNEY D. BENNETT, *Primary Examiner.*

J. P. MORRIS, *Assistant Examiner.*